United States Patent [19]
Buchanan et al.

[11] Patent Number: 6,095,944
[45] Date of Patent: Aug. 1, 2000

[54] CONTROL ASSEMBLY FOR A WORK MACHINE

[76] Inventors: Brian Buchanan, 3 Medina Ct., Clayton, N.C. 27520; Tom Stickles, 1091 Harpeth Dr., Memphis, Tenn. 38134; Gene Zeuck, 4605 Fisk Ct., Raleigh, N.C. 27604

[21] Appl. No.: 09/124,313

[22] Filed: Jul. 29, 1998

Related U.S. Application Data

[60] Provisional application No. 60/092,290, Jul. 10, 1998.

[51] Int. Cl.⁷ .......................... B60K 28/00; B60K 41/26; B60K 41/28
[52] U.S. Cl. ...................... 477/94; 74/480 R; 192/220.1; 477/96
[58] Field of Search .......................... 192/220.1; 477/94, 477/96, 99, 183; 74/473.23, 480 R

[56] References Cited

U.S. PATENT DOCUMENTS

| | | | |
|---|---|---|---|
| 3,262,525 | 7/1966 | Ehlke et al. | 192/13 |
| 3,511,105 | 5/1970 | Matter | 74/481 |
| 3,525,266 | 8/1970 | Brooks et al. | 74/481 |
| 3,702,648 | 11/1972 | Mori | 192/220.1 |
| 3,710,904 | 1/1973 | Boyer et al. . | |
| 3,797,619 | 3/1974 | Suzuki | 192/13 R |
| 3,811,020 | 5/1974 | Johnson et al. | 74/473.23 X |
| 3,857,298 | 12/1974 | Case et al. | 477/99 X |
| 3,868,003 | 2/1975 | Smith . | |
| 4,246,989 | 1/1981 | Kohler | 192/220.1 |
| 4,358,965 | 11/1982 | Schroeder | 74/473.23 |
| 4,491,209 | 1/1985 | Bening . | |
| 4,496,035 | 1/1985 | Wanie | 192/220.1 |
| 4,620,575 | 11/1986 | Cuba et al. | 180/307 |
| 4,932,283 | 6/1990 | Ishigami et al. | 74/473.23 |
| 4,938,302 | 7/1990 | Schott et al. | 180/53.1 |
| 4,955,249 | 9/1990 | Wetor | 74/473 R |
| 5,044,478 | 9/1991 | Kaesgen et al. . | |
| 5,062,316 | 11/1991 | Lykken et al. | 74/529 |
| 5,289,907 | 3/1994 | Pattock | 477/99 X |
| 5,499,553 | 3/1996 | Schott et al. | 74/526 |
| 5,566,581 | 10/1996 | Smale et al. | 477/99 X |

*Primary Examiner*—Rodney H. Bonck

[57] ABSTRACT

A control assembly for a work machine is disclosed which includes a movement actuator positionable between a drive position and a neutral position, wherein (i) the work machine is driven by the engine when the movement actuator is positioned in the drive position, (ii) the work machine is prevented from being driven by the engine when the movement actuator is positioned in the neutral position, and (iii) the movement actuator is spring biased into the neutral position. The control assembly also includes a movement actuator retaining device, wherein (i) the movement actuator retaining device includes a retaining actuator positionable between a "reduced friction" state and an "enhanced friction" state, (ii) the movement actuator is maintained in the drive position when the retaining actuator is positioned in the "enhanced friction" state, and (iii) the movement actuator is allowed to move from the drive position to the neutral position due to the spring bias when the retaining actuator is moved from the "enhanced friction" state to the "reduced friction" state. An adjustment assembly for returning the movement actuator to the neutral position and a control switch for enabling and disabling a starter of the work machine are also provided.

20 Claims, 3 Drawing Sheets

CONTROL ASSEMBLY FOR A WORK MACHINE

This application claims the benefit of U.S. Provisional application Ser. No. 60/092,290, filed Jul. 10, 1998.

TECHNICAL FIELD OF THE INVENTION

The present invention relates generally to a work machine, and more particularly to a control assembly for a work machine.

BACKGROUND OF THE INVENTION

Work machines, such as crawler tractors, typically include a movement actuator or "joy stick". Some crawler tractors also include a return spring coupled to the joy stick which biases the joy stick in a neutral position (i.e. a position where the crawler tractor is prevented from being driven by the engine). The joy stick and return spring function to allow an operator to control the speed and direction of the crawler tractor while performing a work function. For example, when an operator of the crawler tractor applies a force to the joy stick such that the joy stick moves out of the neutral position to a forward drive position (i.e. the joy stick is moved toward the front end of the crawler tractor) the crawler tractor moves in a forward direction. When the operator stops applying force to the joy stick the return spring returns the joy stick to a neutral position so that the crawler tractor stops moving. In a similar manner, when the operator applies a force to the joy stick such that the joy stick moves out of the neutral position to a reverse drive position (i.e. the joy stick is moved toward the rear end of the crawler tractor) the crawler tractor moves in a rearward direction. As described above, when the operator stops applying force to the joy stick the return spring returns the joy stick to the neutral position so that the crawler tractor stops moving.

While the above described arrangement allows the operator to control the forward and rearward motion of the crawler tractor, it does have significant drawbacks. For example, if the crawler tractor is performing a work function such that the operator must hold the joy stick in the forward position for a long period of time (e.g. during a grading operation), the a arm of the operator can become fatigued as a result of having to constantly provide enough force to overcome the return spring bias.

In an attempt to address this problem some crawler tractors have joy sticks designed to remain in the forward or rearward position once placed there by the operator. However, a problem with this design is that the joy stick can be left in the forward or rearward position when the crawler tractor is turned off such that when it is restarted the joy stick is not located in the neutral position thereby causing damage to the components of the crawler tractor. Another problem with this design is that the previously described joy sticks (i.e. the joysticks designed to remain in the forward or rearward position) tend to require a large amount of force to move. Therefore, these joy sticks can also cause operator fatigue, particularly when used during the performance of a work function which requires the operator to change the direction of the crawler tractor a large number of times over a relatively short period of time (e.g. during a land clearing operation).

What is needed therefore is a control assembly for a work machine which overcomes the above-mentioned drawbacks.

DISCLOSURE OF THE INVENTION

In accordance with a first embodiment of the present invention, there is provided a control assembly for a work machine having a starter, an engine, and a brake mechanism. The control assembly includes a movement actuator positionable between a drive position and a neutral position, wherein (i) the work machine is driven by the engine when the movement actuator is positioned in the drive position, and (ii) the work machine is prevented from being driven by the engine when the movement actuator is positioned in the neutral position. The control assembly also includes a brake actuator positionable between a braking position and a release position, wherein (i) movement of the work machine is inhibited by the brake mechanism when the brake actuator is positioned in the braking position, and (ii) movement of the work machine is not inhibited by the brake mechanism when the brake actuator is positioned in the release position. The control assembly further includes an adjustment assembly mechanically coupled to the movement actuator and the brake actuator, wherein the adjustment assembly locates the movement actuator in the neutral position when the brake actuator is located in the braking position. The control assembly also includes an operator start switch electrically coupled to the starter, the operator start switch having an "on" state and an "off" state. The control assembly still further includes a control switch having (i) an "enable" state in which the control switch allows the starter to operate in response to the operator start switch being switched from the "off" state to the "on" state, and (ii) a "disable" state in which the control switch prevents the starter from operating in response to the operator start switch being switched from the "off" state to the "on" state, wherein (i) positioning of the break actuator in the braking position causes the control switch to be placed in the "enable" state, and (ii) positioning of the break actuator in the release position causes the control switch to be placed in the "disable" state.

In accordance with a second embodiment of the present invention, there is provided a control assembly for a work machine having a brake mechanism. The control assembly includes a movement actuator positionable between a drive position and a neutral position, wherein (i) the work machine is driven by the engine when the movement actuator is positioned in the drive position, (ii) the work machine is prevented from being driven by the engine when the movement actuator is positioned in the neutral position, and (iii) the movement actuator is spring biased into the neutral position. The control assembly also includes a brake actuator positionable between a braking position and a release position, wherein (i) movement of the work machine is inhibited by the brake mechanism when the brake actuator is positioned in the braking position, and (ii) movement of the work machine is not inhibited by the brake mechanism when the brake actuator is positioned in the release position. The control assembly further includes an adjustment assembly mechanically coupled to the movement actuator and the brake actuator, wherein the adjustment assembly locates the movement actuator in the neutral position when the brake actuator is located in the braking position. The control assembly still further includes a movement actuator retaining device, wherein (i) the movement actuator retaining device includes a retaining actuator positionable between a "reduced friction" state and an "enhanced friction" state, (ii) the movement actuator is maintained in the drive position when the retaining actuator is positioned in the "enhanced friction" state, and (iii) the movement actuator is allowed to move from the drive position to the neutral position due to the spring bias when the retaining actuator is moved from the "enhanced friction" state to the "reduced friction" state.

In accordance with a third embodiment of the present invention, there is provided a control assembly for a work machine. The control assembly includes a movement actuator positionable between a drive position and a neutral position, wherein (i) the work machine is driven by the engine when the movement actuator is positioned in the drive position, (ii) the work machine is prevented from being driven by the engine when the movement actuator is positioned in the neutral position, and (iii) the movement actuator is spring biased into the neutral position. The control assembly also includes a movement actuator retaining device, wherein (i) the movement actuator retaining device includes a retaining actuator positionable between a "reduced friction" state and an "enhanced friction" state, (ii) the movement actuator is maintained in the drive position when the retaining actuator is positioned in the "enhanced friction" state, and (iii) the movement actuator is allowed to move from the drive position to the neutral position due to the spring bias when the retaining actuator is moved from the "enhanced friction" state to the "reduced friction" state.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
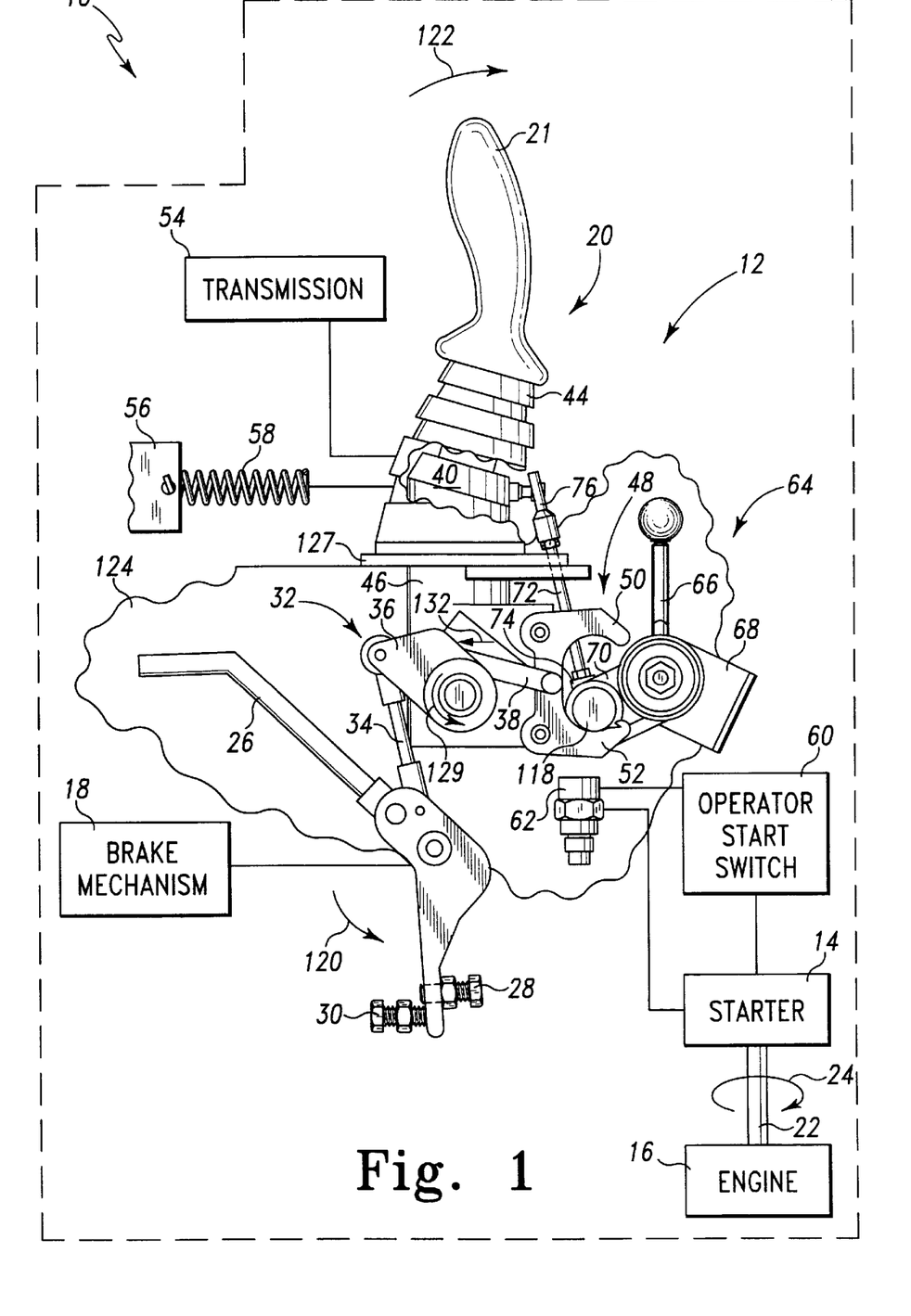
FIG. 1 is a partial schematic, partial fragmentary side elevational view of a control assembly for a work machine which incorporates the features of the present invention therein, showing the brake actuator located in the release position and the movement actuator located in the forward position.
Figure 2:
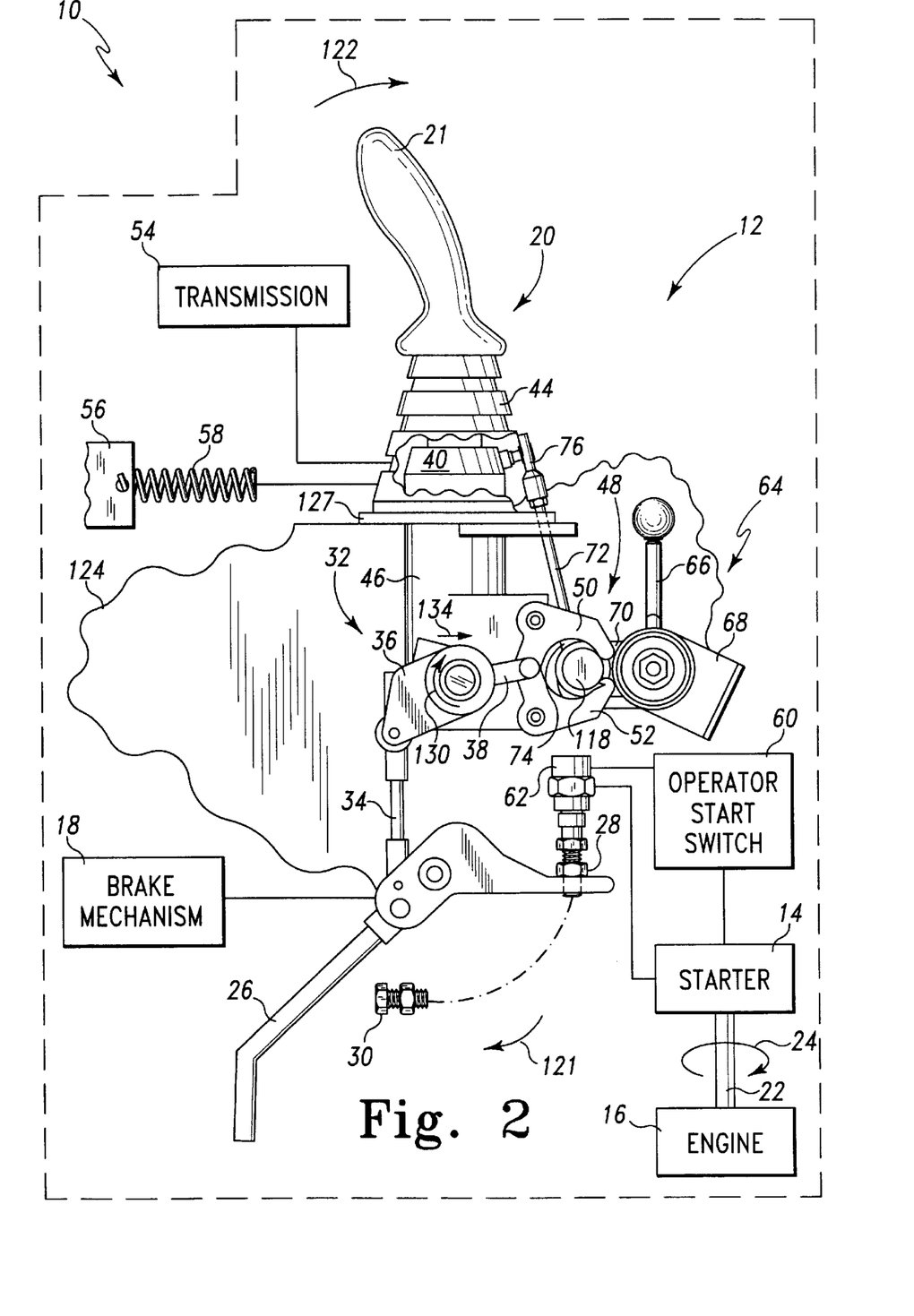
FIG. 2 is a view similar to FIG. 1, but showing the brake actuator located in the braking position and the movement actuator located in the neutral position.

Referring now to FIGS. 1 and 2, there is shown a portion of a work machine 10 having a control assembly 12 which incorporates the features of the present invention therein. Work machine 10 includes a starter 14, an engine 16, and a brake mechanism 18. The work machine 10 may be a crawler tractor of the type available from Caterpillar, Inc. of Peoria Ill. Control assembly 12 includes a movement actuator 20, a brake actuator 26, an adjustment assembly 32, an operator start switch 60, a control switch 62, and an actuator retaining device 64.

Movement actuator 20 includes a handle 21 and a boot 44 attached to handle 21. Movement actuator 20 also includes a collar 40 which is mechanically coupled to handle 21. Movement actuator 20 is pivotally secured to, and supported by, a support member 46. Support member 46 is in turn secured to and supported by a frame component 124 of work machine 10.

Movement actuator 20 is positionable between a drive position and a neutral position. Specifically, movement actuator 20 is positioned in the neutral position when collar 40 is in a substantially parallel relationship with support plate 127 as shown in FIG. 2. Moreover, movement actuator 20 is positioned in a forward drive position when collar 40 is positioned at an angle relative to support plate 127 as shown in FIG. 1. Movement actuator 20 is moved from the neutral position to the forward drive position by moving handle 21 in a direction indicated by arrow 122 (see FIG. 2). Movement actuator 20 can also be moved from the neutral position to a reverse drive position (not shown) by moving handle 21 in a direction opposite to the direction indicated by arrow 122.

Movement actuator 20 is attached to at least one spring 58 as schematically shown in FIGS. 1 and 2. Spring 58 is in turn attached to a bracket 56 such that movement actuator 20 is biased into the neutral position by spring 58. For example, when an operator (not shown) of work machine 10 grasps handle 21 and moves movement actuator 20 from the neutral position to the forward drive position (see FIG. 1), and then releases handle 21, movement actuator 20 spontaneously returns to the neutral position as a result of the above discussed bias provided by spring 58.

Transmission 54 of work machine 10 is operatively coupled to movement actuator 20 such that work machine 10 is driven by engine 16 when movement actuator 16 is positioned in the drive position. Transmission 54 is also operatively coupled to actuator 20 such that work machine 10 is prevented from being driven by engine 16 when movement actuator 20 is positioned in the neutral position.

Brake actuator 26 is rotatably secured to frame component 124 and operatively coupled to brake mechanism 18. Brake actuator 26 is positionable in a release position where brake actuator 26 is in contact with a stop 30 as shown in FIG. 1. Brake actuator 26 is also positionable in a braking position as shown in FIG. 2. Brake actuator 26 is moved from the release position to the braking position by moving brake actuator 26 in a direction indicated by arrow 120 (see FIG. 1). Brake actuator 26 is moved from the braking position to the release position by moving brake actuator 26 in a direction indicated by arrow 121 (see FIG. 2). It should be appreciated that (i) movement of work machine 10 is inhibited by brake mechanism 18 when brake actuator 26 is positioned in the braking position, and (ii) movement of work machine 10 is not inhibited by brake mechanism 18 when brake actuator 26 is positioned in the release position. The brake mechanism 18 is a conventional brake mechanism which functions to prevent movement of work machine 10 and therefore will not be further described.

Adjustment assembly 32 includes a connecting rod 34, an intermediate lever 36, a connecting bar 38, and a scissor device 48 having an upper jaw 50 and a lower jaw 52. Intermediate lever 36 is rotatably secured to frame component 124. One end of connecting rod 34 is attached to brake actuator 26, while the other end of connecting rod 34 is attached to intermediate lever 36. Therefore, movement of brake actuator 26 from the release position to the braking position causes intermediate lever 36 to rotate relative to support member 46 in a direction indicated by arrow 129 (see FIG. 1). On the other hand, movement of brake actuator 26 from the braking position to the release position causes intermediate lever 36 to rotate relative to support member 46 in a direction indicated by arrow 130 (see FIG. 2).

With respect to connecting bar 38, one end thereof is attached to intermediate lever 36, while the other end thereof is attached to upper jaw 50 and lower jaw 52 of scissor device 48. Connecting bar 38 is attached to intermediate lever 36 such that when brake actuator 26 is moved from the release position to the braking position, connecting bar 38 moves relative to support member 46 in a direction indicated by arrow 132 (see FIG. 1). Moreover, connecting bar 38 is attached to intermediate lever 36 such that when brake actuator 26 is moved from the braking position to the release position connecting bar 38 moves relative to support member 46 in a direction indicated by arrow 134 (see FIG. 2).

Upper jaw 50 and lower jaw 52 of scissor device 48 are each rotatably attached to support member 46. Connecting bar 38 is connected to upper jaw 50 and lower jaw 52 such that upper jaw 50 and lower jaw 52 move toward each other when connecting bar 38 moves in the direction indicated by arrow 132 (i.e. when brake actuator 26 is moved from the release position to the braking position). It should also be appreciated that connecting bar 38 is connected to upper jaw 50 and lower jaw 52 such that upper jaw 50 and lower jaw 52 move away from each other when connecting bar 38 moves in the direction indicated by arrow 134 (i.e. when brake actuator 26 is moved from the braking position to the release position).

Operator start switch 60 is electrically coupled to starter 14 as schematically shown in FIGS. 1 and 2. Starter 14 is mechanically coupled to engine 16 by output shaft 22. Operator start switch 60 has an "on" state and an "off" state. When the operator of work machine 10 places operator start switch 60 in the "on" state (e.g. by turning a key (not shown) or pressing a button (not shown)) starter 14 is powered by a battery (not shown) such that output shaft 22 rotates in a direction indicated by arrow 24 thereby starting engine 16 such that work machine 10 can be operated to perform various work functions. Conversely, when the operator of work machine 10 places operator start switch 60 in the "off" state (e.g. by turning a key operation of engine 16 is ceased in a well know manner.

Control switch 62 is preferably a contact switch electrically coupled to operator start switch 60 as schematically shown in FIGS. 1 and 2. One type of contact switch which can be used in the present invention is available from the Eaton Corporation of Cleveland, Ohio as part number H11-1659. Control switch 62 has (i) an "enable" state in which control switch 62 allows starter 14 to operate in response to operator start switch 60 being switched from the "off" state to the "on" state, and (ii) a "disable" state in which control switch 62 prevents starter 14 from operating in response to operator start switch 60 being switched from the "off" state to the "on" state. Therefore, it should be understood that (i) the operator of work machine 10 can start engine 16 of work machine 10 when the control switch 62 is in the "enable" state and (ii) the operator of work machine 10 can not start engine 16 of work machine 10 when the control switch 62 is in the "disable" state.

An important aspect of the present invention is that control switch 62 is positioned relative to brake actuator 26 such that (i) a stop 28 attached to brake actuator 26 contacts control switch 62 when brake actuator 26 is located in the braking position and (ii) stop 28 does not contact control switch 62 when brake actuator 26 is located in the release position. It should be understood that contacting control switch 62 with stop 28 causes control switch 62 to be placed in the "enable" state so that starter 14 can operate in response to operator start switch 60 being switched from the "off" state to the "on" state so as to start engine 16. It should also be understood that when stop 28 is not in contact with control switch 62 control switch 62 is placed in the "disable" state so that starter 14 can not operate in response to operator start switch 60 being switched from the "off" state to the "on" state so that engine 16 can not start. Therefore, it should be appreciated that the operator can only start engine 16 of work machine 10 when brake actuator 26 is located in the braking position and movement of work machine 10 is inhibited by brake mechanism 18.

Figures 3, 4:
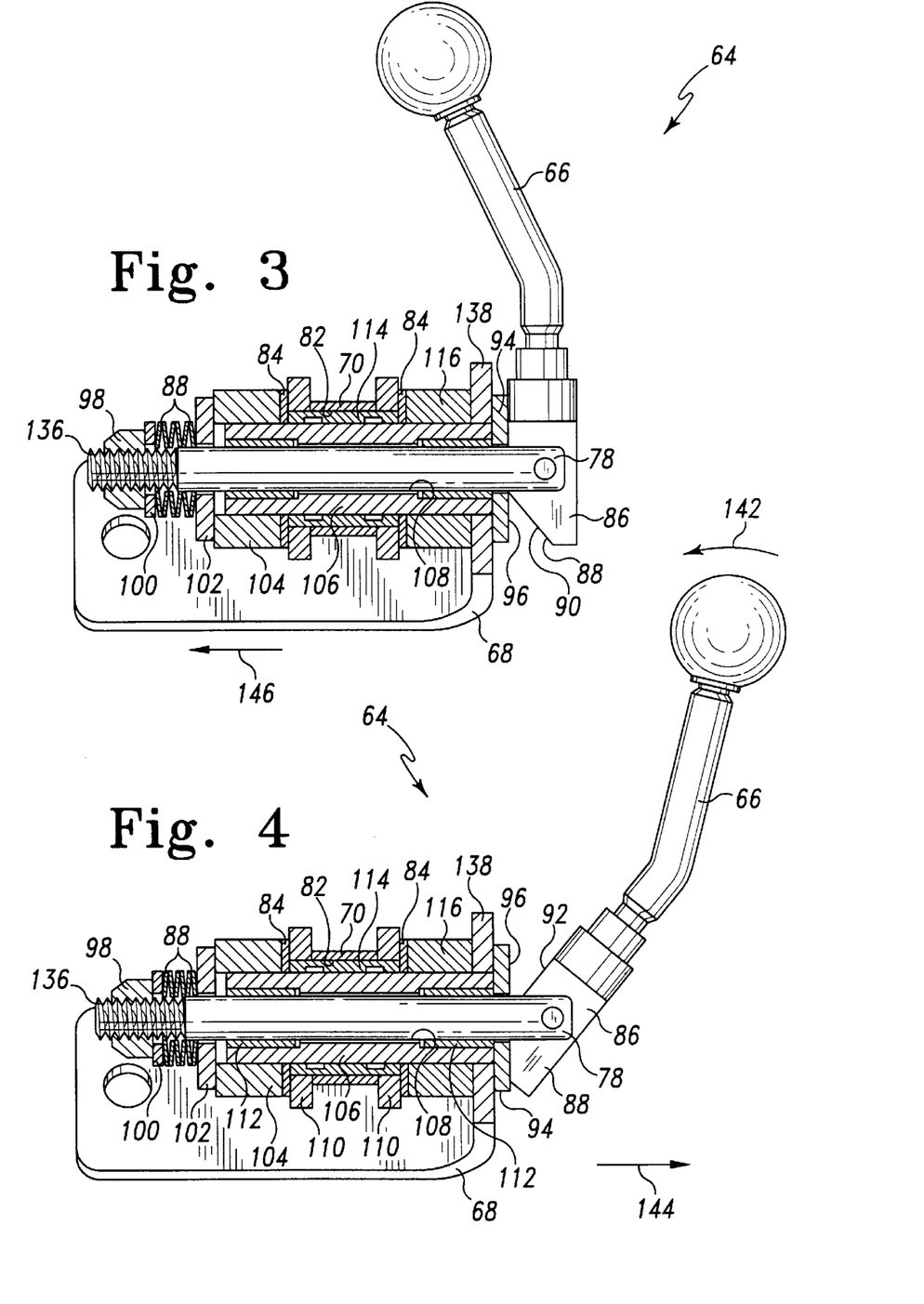
FIG. 3 is a cross sectional view of the movement actuator retaining device of FIG. 1, with the retaining actuator shown located in the "reduced friction state" state.
FIG. 4 is a view similar to FIG. 3, but showing the retaining actuator located in the "enhanced friction state".

Referring now to FIGS. 3 and 4, actuator retaining device 64 includes a bracket 68 having a bracket boss 106 attached thereto. Actuator retaining device 64 also includes a shaft 78, a bearings 112, a retaining actuator 66, a cam 86 having a beveled surface 88 which defines a cam surface 90 and a cam surface 92, a bearing 94, a spacer 116, a pair of friction pads 84, a retaining lever 70, a pair of plates 110 secured to retaining lever 70, a needle bearing 114, a friction collar 104, a washer 102, a number of belleville springs 88, a washer 100, a retaining rod 72, and a nut 98.

Shaft 78 is positioned within a passageway 108 defined by bracket boss 106 such that a threaded end 136 of shaft 78 extends out of passageway 108. Bearings 112 are disposed around shaft 78 such that bearings 112 are interposed between shaft 78 and bracket boss 106. The following components of movement actuator device 64 are disposed around shaft 78 as described below. Spacer 116 is positioned in contact with a flange 138 of bracket 68. The first friction pad 84 is positioned in contact with spacer 116. The first plate 110 is positioned in contact with the first friction pad 84 such that the first friction pad 84 is interposed between the first plate 110 and spacer 116. Retainer lever 70 is positioned in contact with the first plate 110. It should be understood that retainer lever 70 has a hole 82 defined therein through which shaft 78 extends. The second plate 110 is also positioned in contact with retainer lever 70 such that retainer lever 70 is interposed between plates 110. The second friction pad 84 is positioned in contact with the second plate 110. Friction collar 104 is positioned in contact with the second friction pad 84 such that the second friction pad 84 is interposed between friction collar 104 and the second plate 110. Washer 102 is positioned in contact with friction collar 104. Belleville springs 88 are positioned in contact with washer 102. Washer 100 is positioned in contact with one of the belleville springs 88. Nut 98 is screwed on to threaded end 138 of shaft 78 such that washer 100 and belleville springs 88 are interposed between nut 98 and washer 102. Retaining actuator 66 is attached to cam 86, and cam 86 is pivotally attached to the end of shaft 78 opposite to threaded end 138. Bearing 94 is interposed between cam 86 and flange 138 such that shaft 78 extends through bearing 94. It should be appreciated that needle bearing 114 allows retainer lever 70 and plates 110 to rotate relative to shaft 78 between a first lever position as shown in FIG. 1 and a second lever position as shown in FIG. 2.

Referring back to FIGS. 1 and 2, movement actuator retaining device 64 is secured to frame component 124 such that retaining lever 70 is adjacent to scissor device 48. In addition, movement actuator retaining device 64 is secured to frame component 124 such that a stud 118 extending from retaining lever 70 is interposed between upper jaw 50 and lower jaw 52 of scissor device 48. A first end 74 of retaining rod 72 is coupled to retaining lever 70 and a second end 76 thereof is coupled to collar 40 of movement actuator 20.

Retaining actuator 66 is positionable between a "reduced friction state", as shown in FIG. 3, and an "enhanced friction state" as shown in FIG. 4. Retaining actuator 66 is positioned in the "enhanced friction state" by moving retaining actuator 66 in a direction indicated by arrow 140 (see FIG. 3) such that cam surface 90 contacts a sidewall 96 of bearing 94. When retaining actuator 66 is moved from the "reduced friction state" to the "enhanced friction state" as described above shaft 78 is pulled in a direction indicated by arrow 144 (see FIG. 4). Moving shaft in the above described manner compresses belleville springs 88 and thus transmits a bias through shaft 78 such that cam surface 90 is urged against sidewall 96 of bearing 94.

Conversely, retaining actuator 66 is positioned in the "reduced friction state" by moving retaining actuator 66 in a direction indicated by arrow 142 (see FIG. 3). When retaining actuator 66 is moved from the "enhanced friction state" to the "reduced friction state" as described above shaft 78 is pushed in a direction indicated by arrow 146 (see FIG. 3). Moving shaft in the above described manner places belleville springs 88 in a relatively decompressed state as compared to when retaining actuator 66 is placed in the "enhanced friction state" as described above. However, even when belleville springs 88 are in the relatively decompressed state, a bias (albeit of lesser magnitude in comparison to the above described bias) is transmitted through shaft 78 such that cam surface 92 is urged against sidewall 96 of bearing 94.

It should be understood that when retaining actuator 66 is placed in the "enhanced friction state" belleville springs 88 urge friction pads 84 against plates 110 of retaining lever 70. Urging friction pads 84 against plates 110 of retaining lever 70 inhibits movement of retaining lever 70 between the first lever position and the second lever position. One type of friction pad which can be used in the present invention is available from the Universal Friction Composites of Manheim, Pa., as part number M83-51.

It should be understood that having retaining lever 70 coupled to movement actuator 20 in the above described manner results in movement of movement actuator 20 from the forward drive position to the neutral position thereby causing the retaining lever 70 to move from the first lever position to the second lever position. In addition, it should be understood that positioning of retaining actuator 66 in the "enhanced friction" state inhibits movement of retaining lever 70 from the first lever position to the second lever position. Therefore, (i) movement actuator 20 is maintained in the forward drive position when retaining actuator 66 is positioned in the "enhanced friction" state, and (ii) movement actuator 20 is allowed to move from the drive position to the neutral position due to the spring bias provided by spring 58 (see FIGS. 1 and 2) when retaining actuator 66 is moved from the "enhanced friction" state to the "reduced friction" state.

Furthermore, it should be appreciated that having stud 118 extending from retainer lever 70 such that stud 118 is interposed between upper jaw 50 and lower jaw 52 of scissor device 48 results in adjustment assembly 32 automatically locating retainer lever 70 in the second lever position. Specifically, as upper jaw 50 and lower jaw 52 move toward each other as a result of moving brake actuator from the release position to the braking position, stud 118 is contacted by lower jaw 52 and thus retainer lever 70 is automatically moved to the second lever position. It should also be understood that as a result of having retainer lever 70 coupled to movement actuator 20 in the above described manner, movement actuator 20 is automatically moved from the drive position to the neutral position as lever 70 is moved to the second lever position.

INDUSTRIAL APPLICABILITY

During use of work machine 10 the operator thereof initially places operator start switch 60 in the "on" state so as to start engine 16 of work machine 10. However, as discussed above, brake actuator 26 must be in the brake position before starter 14 is capable of starting engine 16. In addition, placing brake actuator 26 in the braking position automatically places movement actuator 20 in the neutral position. Therefore, it should be understood that the present invention ensures that work machine 10 is in neutral (i.e. work machine 10 is prevented from being driven by engine 16) and brake actuator 26 is in the braking position (i.e. movement of work machine 10 is inhibited by brake mechanism 18) before work machine 10 can be started by starter 14. This is an advantage of the present invention since it ensures that work machine 10 will not be started in the drive position which can damage components of work machine 10. Once engine 16 is started, brake actuator 26 is moved to the release position so that upper jaw 50 and lower jaw 52 move away from each other and thus allow movement actuator 20 to be moved to the drive position so that work machine 10 can perform various work functions.

If the above-mentioned work functions require the operator to hold movement actuator 20 in the drive position for a significant period of time, retaining actuator 66 can be positioned in the "enhanced friction" state in the above described manner so that movement actuator 20 is maintained in the drive position without the operator applying any force thereto. This is an advantage of the present invention since it prevents the arm of the operator from becoming fatigued. However, it should be understood that if work machine 10 is used to perform work functions which requires the operator to move movement actuator 20 (e.g. from the drive position to the neutral position) a large number of times over a relatively short period of time, retaining actuator 66 can be moved from the "enhanced friction" state to the "reduced friction" state so that the movement actuator 20 can be more easily manipulated.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A control assembly for a work machine having a starter, an engine, and a brake mechanism, comprising:

a movement actuator positionable between a drive position and a neutral position, wherein (i) said work machine is driven by said engine when said movement actuator is positioned in said drive position, and (ii) said work machine is prevented from being driven by said engine when said movement actuator is positioned in said neutral position;

a brake actuator positionable between a braking position and a release position, wherein (i) movement of said work machine is inhibited by said brake mechanism when said brake actuator is positioned in said braking position, and (ii) movement of said work machine is not inhibited by said brake mechanism when said brake actuator is positioned in said release position;

an adjustment assembly mechanically coupled to said movement actuator and said brake actuator, wherein said adjustment assembly locates said movement actuator in said neutral position when said brake actuator is located in said braking position;

an operator start switch electrically coupled to said starter, said operator start switch having an "on" state and an "off" state; and a control switch having (i) an "enable" state in which said control switch allows said starter to operate in response to said operator start switch being switched from said "off" state to said "on" state, and (ii) a "disable" state in which said control switch prevents said starter from operating in response to said operator start switch being switched from said "off" state to said "on" state, wherein (i) positioning of said brake actuator in said braking position causes said control switch to be placed in said "enable" state, and (ii) positioning of said brake actuator in said release position causes said control switch to be placed in said "disable" state.

2. The control assembly of claim 1, further comprising a movement actuator retaining device which maintains said movement actuator in said drive position.

3. The control assembly of claim 2, wherein:

said movement actuator is spring biased into said neutral position, said movement actuator retaining device includes a retaining actuator positionable between a "reduced friction" state and an "enhanced friction" state, said movement actuator is maintained in said drive position when said retaining actuator is positioned in said "enhanced friction" state, and said movement actuator is allowed to move from said drive position to said neutral position due to said spring bias when said retaining actuator is moved from said "enhanced friction" state to "reduced friction" state.

4. The control assembly of claim 3, wherein:

said movement actuator retaining device further includes a retaining lever which is positionable between a first lever position and a second lever position, movement of said movement actuator from said drive position to said neutral position causes said retaining lever to move from said first lever position to said second lever position, and positioning of said retaining actuator in said "enhanced friction" state inhibits movement of said retaining lever from said first lever position to said second lever position.

5. The control assembly of claim 4, further comprising a retaining rod having a first end and a second end, wherein:

said first end of said retaining rod is coupled to said retaining lever and said second end of said retaining rod is coupled to said movement actuator.

6. The control assembly of claim 4, wherein:

said movement actuator retaining device further includes a shaft pivotally attached to said retaining actuator, said movement actuator retaining device further includes a spring disposed around said shaft, said retaining lever has a hole defined therein through which said shaft extends, said spring is compressed when said retaining actuator is moved from said "reduced friction" state to said "enhanced friction" state, and said spring generates a biasing force which is transmitted against said retaining lever when said retaining actuator is positioned in said "enhanced friction" state.

7. The control assembly of claim 6, wherein:

said movement actuator retaining device further comprises a friction pad, and said spring biases said friction pad toward said retaining lever when said retaining actuator is positioned in said "enhanced friction" state.

8. The control assembly of claim 7, wherein:

said movement actuator retaining device further includes a cam attached to said retaining actuator, said cam is pivotally attached to said shaft, said cam includes a beveled surface which defines a first cam surface and a second cam surface, said movement actuator retaining device further includes a bearing through which said shaft extends, said spring urges said first cam surface into contact with a sidewall of said bearing when said retaining actuator is positioned in said "enhanced friction" state, and said spring urges said second cam surface into contact with said sidewall of said bearing when said retaining actuator is positioned in said "reduced friction" state.

9. A control assembly for a work machine having a brake mechanism, comprising:

a movement actuator positionable between a drive position and a neutral position, wherein (i) said work machine is driven by said engine when said movement actuator is positioned in said drive position, (ii) said work machine is prevented from being driven by said engine when said movement actuator is positioned in said neutral position, and (iii) said movement actuator is spring biased into said neutral position;

a brake actuator positionable between a braking position and a release position, wherein (i) movement of said work machine is inhibited by said brake mechanism when said brake actuator is positioned in said braking position, and (ii) movement of said work machine is not inhibited by said brake mechanism when said brake actuator is positioned in said release position;

an adjustment assembly mechanically coupled to said movement actuator and said brake actuator, wherein said adjustment assembly locates said movement actuator in said neutral position when said brake actuator is located in said braking position; and a movement actuator retaining device, wherein (i) said movement actuator retaining device includes a retaining actuator positionable between a "reduced friction" state and an "enhanced friction" state, (ii) said movement actuator is maintained in said drive position when said retaining actuator is positioned in said "enhanced friction" state, and (iii) said movement actuator is allowed to move from said drive position to said neutral position due to said spring bias when said retaining actuator is moved from said "enhanced friction" state to "reduced friction" state.

10. The control assembly of claim 9, wherein:

said movement actuator retaining device further includes a retaining lever which is positionable between a first lever position and a second lever position, movement of said movement actuator from said drive position to said neutral position causes said retaining lever to move from said first lever position to said second lever position, and positioning of said retaining actuator in said "enhanced friction" state inhibits movement of said retaining lever from said first lever position to said second lever position.

11. The control assembly of claim 10, further comprising a retaining rod having a first end and a second end, wherein:

said first end of said retaining rod is coupled to said retaining lever and said second end of said retaining rod is coupled to said movement actuator.

12. The control assembly of claim 10, wherein:

said movement actuator retaining device further includes a shaft pivotally attached to said retaining actuator, said movement actuator retaining device further includes a spring disposed around said shaft, said retaining lever has a hole defined therein through which said lever extends, said spring is compressed when said retaining actuator is moved from said "reduced friction" state to said "enhanced friction" state, and said spring generates a biasing force which is transmitted against said retaining lever when said retaining actuator is positioned in said "enhanced friction" state.

13. The control assembly of claim 12, wherein:

said movement actuator retaining device further comprises a friction pad, and said spring biases said friction pad into contact with said retaining lever when said retaining actuator is positioned in said "enhanced friction" state.

14. The control assembly of claim 13, wherein:

said movement actuator retaining device further includes a cam attached to said retaining actuator, said cam is pivotally attached to said shaft, said cam includes a beveled surface which defines a first cam surface and a second cam surface, said movement actuator retaining device further includes a bearing through which said shaft extends, said spring urges said first cam surface into contact with a sidewall of said bearing when said retaining actuator is positioned in said "enhanced friction" state, and said spring urges said second cam surface into contact with said sidewall of said bearing when said retaining actuator is positioned in said "reduced friction" state.

15. A control assembly for a work machine, comprising:

a movement actuator positionable between a drive position and a neutral position, wherein (i) said work machine is driven by said engine when said movement actuator is positioned in said drive position, (ii) said work machine is prevented from being driven by said engine when said movement actuator is positioned in said neutral position, and (iii) said movement actuator is spring biased into said neutral position; and a movement actuator retaining device, wherein (i) said movement actuator retaining device includes a retaining actuator positionable between a "reduced friction" state and an "enhanced friction" state, (ii) said movement actuator is maintained in said drive position when said retaining actuator is positioned in said "enhanced friction" state, and (iii) said movement actuator is allowed to move from said drive position to said neutral position due to said spring bias when said retaining actuator is moved from said "enhanced friction" state to "reduced friction" state.

16. The control assembly of claim 15, wherein:

said movement actuator retaining device further includes a retaining lever which is positionable between a first lever position and a second lever position, movement of said movement actuator from said drive position to said neutral position causes said retaining lever to move from said first lever position to said second lever position, and positioning of said retaining actuator in said "enhanced friction" state inhibits movement of said retaining lever from said first lever position to said second lever position.

17. The control assembly of claim 16, further comprising a retaining rod having a first end and a second end, wherein:

said first end of said retaining rod is coupled to said retaining lever and said second end of said retaining rod is coupled to said movement actuator.

18. The control assembly of claim 16, wherein:

said movement actuator retaining device further includes a shaft pivotally attached to said retaining actuator, said movement actuator retaining device further includes a spring disposed around said shaft, said retaining lever has a hole defined therein through which said lever extends, said spring is compressed when said retaining actuator is moved from said "reduced friction" state to said "enhanced friction" state, and said spring generates a biasing force which is transmitted against said retaining lever when said retaining actuator is positioned in said "enhanced friction" state.

19. The control assembly of claim 18, wherein:

said movement actuator retaining device further comprises a friction pad, and said spring biases said friction pad into contact with said retaining lever when said retaining actuator is positioned in said "enhanced friction" state.

20. The control assembly of claim 19, wherein:

said movement actuator retaining device further includes a cam attached to said retaining actuator, said cam is pivotally attached to said shaft, said cam includes a beveled surface which defines a first cam surface and a second cam surface, said movement actuator retaining device further includes a bearing through which said shaft extends, said spring urges said first cam surface into contact with a sidewall of said bearing when said retaining actuator is positioned in said "enhanced friction" state, and said spring urges said second cam surface into contact with said sidewall of said bearing when said retaining actuator is positioned in said "reduced friction" state.

* * * * *

UNITED STATES PATENT AND TRADEMARK OFFICE
CERTIFICATE OF CORRECTION

PATENT NO.    : 6,095,944
DATED         : August 1, 2000
INVENTOR(S)   : Brian Buchanan et al.

It is certified that error appears in the above-identified patent and that said Letters Patent is hereby corrected as shown below:

(73) Assignee: Caterpillar Inc., Peoria, Ill.

Signed and Sealed this

Seventh Day of August, 2001

*Attest:*

NICHOLAS P. GODICI
*Attesting Officer*       *Acting Director of the United States Patent and Trademark Office*